United States Patent [19]

Beckhaus et al.

[11] Patent Number: 4,857,281
[45] Date of Patent: Aug. 15, 1989

[54] PAULING BOILER AND PROCESS FOR THE CONCENTRATION OF SULPHURIC ACID

[75] Inventors: Heiko Beckhaus, Leverkusen; Harro Witt, Kuden; Peter Klein, Itzehoe, all of Fed. Rep. of Germany

[73] Assignee: Bayer Aktiengesellschaft, Leverkusen, Fed. Rep. of Germany

[21] Appl. No.: 144,292

[22] Filed: Jan. 15, 1988

[30] Foreign Application Priority Data

Jan. 29, 1987 [DE] Fed. Rep. of Germany ....... 3702541

[51] Int. Cl.$^4$ ...................... C01B 12/90; C01B 17/48; B01J 1/20; C10B 29/00

[52] U.S. Cl. .................................. 423/531; 422/160; 422/161; 422/240; 423/522; 202/267.1

[58] Field of Search ............... 423/522, 531; 422/160, 422/161, 240; 202/269 R; 126/390; 266/282; 428/653

[56] References Cited

U.S. PATENT DOCUMENTS

| | | | |
|---|---|---|---|
| 1,881,064 | 10/1932 | Sayles et al. | 428/653 |
| 2,303,869 | 12/1942 | Quinian et al. | 428/653 |
| 3,059,326 | 10/1962 | Jominy et al. | 428/653 |
| 3,788,513 | 1/1974 | Racz | 126/390 |
| 3,881,881 | 5/1975 | Kim | 428/653 |
| 4,535,034 | 8/1985 | Zaizen et al. | 428/653 |
| 4,596,236 | 1/1986 | Elde | 126/390 |

FOREIGN PATENT DOCUMENTS

| | | |
|---|---|---|
| 0037508 | 10/1981 | European Pat. Off. . |
| 299774 | 8/1915 | Fed. Rep. of Germany ...... 423/531 |
| 3208980 | 10/1983 | Fed. Rep. of Germany . |
| 60-5002 | 1/1985 | Japan .................... 423/651 |

*Primary Examiner*—Gary P. Straub
*Attorney, Agent, or Firm*—Sprung Horn Kramer & Woods

[57] ABSTRACT

A Pauling boiler for the concentration of sulphuric acid, wherein the external surface of the Pauling boiler is coated with aluminum.

A process for the concentration of sulphuric acid in Pauling boilers by underfiring with gas or liquid fuels, wherein the concentration is carried out in a Pauling boiler coated with aluminum.

3 Claims, 1 Drawing Sheet

PAULING BOILER AND PROCESS FOR THE CONCENTRATION OF SULPHURIC ACID

BACKGROUND OF THE INVENTION

1. Field of the Invention

The present invention relates to improved Pauling Boilers for the concentration of sulphuric acid and to a process for the concentration of sulphuric acid in these improved Pauling Boilers.

2. Background Information

Waste sulphuric acid is frequently concentrated in grey cast iron boilers, so called Pauling Boilers, and thereby regenerated. This process is the object of DE-C 299 774. The waste sulphuric acid, which is at a concentration of about 70%, is introduced into a stripping column mounted on a vessel of grey cast iron which serves as still. The boiler, which is fired with gas or mineral oil, is filled with boiling, concentrated sulphuric acid which is drawn-off at the rate at which fresh acid is introduced and is cooled. The water present in the waste sulphuric acid leaves the stripping column as super-heated steam at 120° C. to 175° C.

Pauling Boilers are subject to corrosion on the inside due to the hot, concentrated sulphuric acid, but corrosion from outside in the firing chamber is particularly critical. The cast iron boiler develops scale according to the degree and distribution temperature in the firing chamber. Surface scaling is particularly severe when the output rate is high or when heat transfer is inefficient due to the deposition of iron sulphate on the internal wall of the boiler. The transfer of heat from the hot fuel gases to the boiling sulphuric acid becomes less efficient and requires progressively more energy input. The layer of scale also serves as an efficient insulating layer. If a scaled surface layer partially bursts off, thermal stresses are produced in the structure of the cast iron, which may cause cracking.

Further tensions and stresses in the periphery due to temperature changes as a result of starting and stopping of the operation and the diffusion of hot fuel gases into the structure are liable to deepen the cracks so that the cracks become visible on the surface. One disadvantage is that such structural changes and the cracks which inevitably form in the course of time can only be examined when the apparatus is cold. The risk of complete breakage of the boiler after a prolonged time in operation cannot be excluded.

Although scaling could be avoided by employing low surface temperatures, the production capacity would then be reduced and the process would become uneconomical.

It is therefore an object of the present invention to provide Pauling Boilers which do not have the disadvantages described above.

SUMMARY OF THE INVENTION

It has now surprisingly been found that these requirements can be fulfilled in an eminently suitable manner by using Pauline Boilers which are coated with aluminum on the outside.

The present invention thus relates to Pauling Boilers for the concentration of sulphuric acid, characterized in that the external surface of the boiler is coated with aluminum.

DETAILED DESCRIPTION OF THE INVENTION

Figure 1:
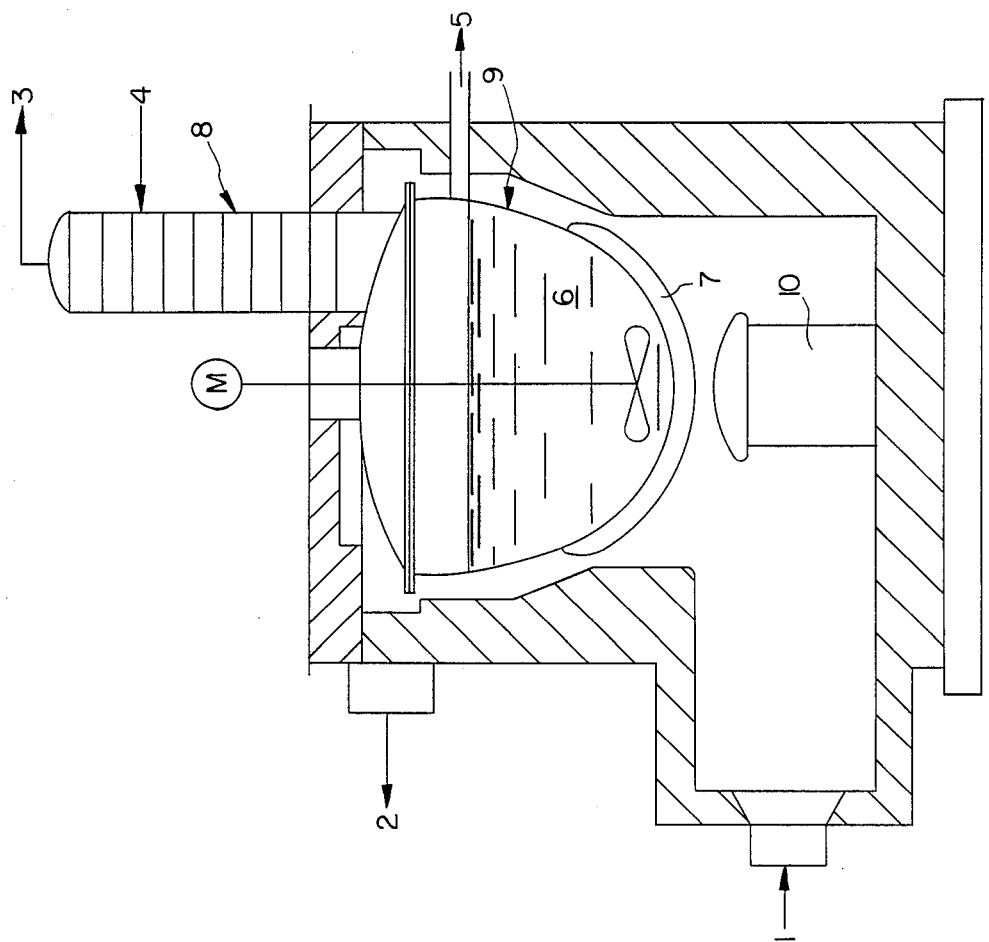
FIG. 1 is a cross-sectional view of a boiler assembly according to the present invention.

The aluminum coating may be applied to the Pauling Boiler by known metal spray processes in which the aluminum is targeted on the surface of the boiler from a short distance by melting the metal with an oxyacetylene flame and accelerating it to about 200 m/s.

The aluminum spray partly penetrates the grain boundaries which have been exposed on the surface of the cast iron, and an aluminum layer 0.5 to 0.7 mm in thickness is formed.

For the Pauling Boilers according to this invention, the thickness of the aluminum coating should be from 0.2 to 2 mm. The aluminum coating according to the inventio may be applied both to new Pauling Boilers and to those which have already been in operation, but the grey cast iron should be bombarded with suitable spraying material under pressure immediately before the coating operation.

The aluminum used for coating according to the invention should have a degree of purity of from 50 to 99.99%.

When the Pauling Boiler heats up as it is put into operation, the aluminum layer partly melts and may even drip, but after a suitable residence time at temperatures of about 100° to 650° C., a dense skin of oxide remains embodied in the perlite structure of the cast iron, and this oxide skin improves the heat transfer from the hot fuel gases to the sulphuric acid. Another advantage is that owing to the closed layer of thin aluminum oxide, no decarbonization, scaling or structural changes takes place on the surface of the cast metal. Stress corrosion cracking and hence the risk of breakage of the boiler from the side exposed to the fuel gas is thus reduced to a minimum.

The present invention further relates to a process for the concentration of sulphuric acid in Pauling Boilers by combustion with gas or liquid fuel, characterized in that this concentation is carried out in the Pauling Boilers according to the invention.

This provides the process with the commercial advantage that the improved efficiency of heat transfer enables higher fuel gas temperatures to be employed. The heating capacity is increased by about 20% above the normally permissible maximum continuous load.

In a particularly preferred embodiment of the process according to the invention, the fuel used for underfiring the Pauling Boilers consists of fuel gases which have an oxygen excess of, preferably, from 2 to 5 vol.-%. The air excess of 20 vol.-% in fuel gas as recommended by the suppliers of the boilers is thus drastically reduced. This in turn leads to a reduction in the $NO_x$ values in the fuel gas so that no further measures are required for removing nitrogen oxide from the waste gas. The saving in primary energy may amount to about 20%.

FIG. 1 shows the construction of an assembly for concentrating spent sulphuric acid by way of example.

The reference numerals indicating the parameters for operating a Pauline Boiler according to the invention have the following meanings:

1. Combustion
2. Flue gas
3. Steam driven off

4. Introduction of spent sulphuric acid
5. Concentrated sulphuric acid produced
6. Boiling concentrated sulphuric acid
7. Aluminum coating
8. Dephlegmator
9. Still
10. Distributor of circulated flue gas.

The invention is described below by way of nonlimiting examples.

EXAMPLE 1

(Comparison Example)

Concentration of sulphuric acid without coating.

When natural gas (1) was supplied at the rate of 200 m$^3$/h, spent sulphuric acid at a concentration of 76% (4) could be introduced at the rate of 5,340 kg/h to produce 4,230 kg/h of 96% sulphuric acid (5). At the same time, 1,110 kg/h of steam (3) was driven off at temperatures of from 120° to 170° C. The current of flue gas (2) contained from 10 to 12 vol-% of $O_2$ and about 400 ppm of $NO_x$ gases.

EXAMPLE 2

Concentration of sulphuric acid with aluminum coating.

When natural gas (1) was supplied at the rate of 180 m$^3$/h, spent sulphuric acid at a concentration of 76% (4) could be introduced at the rate of 5,520 kg/h to produce 4,370 kg/h of 96% sulphuric acid (5). At the same time, 1,150 kg/h of steam (3) were driven off at temperature of from 120° to 170° C. The current of flue gas (2) contained from 2 to 5 vol-% of $O_2$ and about 100 to 170 ppm of $NO_x$ gases.

It will be appreciated that the instant specification and claims are set forth by way of illustration and not limitation, and that various modifications and changes may be made without departing from the spirit and scope of the present invention.

What is claimed is:

1. In a cast iron Pauling boiler for the concentration of sulphuric acid by underfiring with gas or liquid fuels, wherein the improvement comprises that the external surface of the Pauling boiler is coated with aluminum, wherein the aluminum a has purity of from 50 to 99.99%, whereby the underfiring is carried out with circulated flue gas which has an oxygen content of 2 to 5 volume %.

2. A Pauling boiler according to claim 1, wherein the thickness of the aluminum coating is from 0.2 to 2 mm.

3. In a process for the concentration of sulphuric acid in a cast iron Pauling boiler by underfiring with gas or liquid fuels, the improvement comprising conducting the concentration in a Pauling boiler according to claim 1, wherein the underfiring is carried out with circulated flue gas which has an oxygen excess of from 2 to 5 vol.-%.

* * * * *

UNITED STATES PATENT AND TRADEMARK OFFICE
CERTIFICATE OF CORRECTION

PATENT NO. : 4,857,281
DATED : August 15, 1989
INVENTOR(S) : Beckhaus, et. al.

It is certified that error appears in the above-indentified patent and that said Letters Patent is hereby corrected as shown below:

Column 4, line 5, claim 1, delete "a has" and substitute --has a --.

Column 4, lines 6-8, claim 1, delete entirely and substitute -- 99.9% and wherein means are provided for carring out the underfiring with circulated flue gas which has an oxygen excess of 2 to 5 volumn % --.

Signed and Sealed this

Ninth Day of November, 1993

Attest:

BRUCE LEHMAN

Attesting Officer     Commissioner of Patents and Trademarks